(12) United States Patent
Schaefer et al.

(10) Patent No.: US 11,307,929 B2
(45) Date of Patent: Apr. 19, 2022

(54) MEMORY DEVICE WITH STATUS FEEDBACK FOR ERROR CORRECTION

(71) Applicant: Micron Technology, Inc., Boise, ID (US)

(72) Inventors: Scott E. Schaefer, Boise, ID (US); Aaron P. Boehm, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/898,354

(22) Filed: Jun. 10, 2020

(65) Prior Publication Data
US 2020/0394103 A1 Dec. 17, 2020

Related U.S. Application Data

(60) Provisional application No. 62/862,254, filed on Jun. 17, 2019.

(51) Int. Cl.
| | |
|---|---|
| *G06F 11/10* | (2006.01) |
| *G06F 11/32* | (2006.01) |
| *G06F 11/30* | (2006.01) |
| *G06F 11/07* | (2006.01) |

(52) U.S. Cl.
CPC ...... *G06F 11/1068* (2013.01); *G06F 11/0772* (2013.01); *G06F 11/1044* (2013.01); *G06F 11/3037* (2013.01); *G06F 11/326* (2013.01)

(58) Field of Classification Search
CPC ............ G06F 11/1068; G06F 11/1044; G06F 11/326; G06F 11/3037; G06F 11/0772; G06F 11/1048; G06F 11/0751; G06F 11/3058; G06F 11/0793; G06F 11/073

USPC ......................................................... 714/6.1
See application file for complete search history.

(56) References Cited

U.S. PATENT DOCUMENTS

| | | | |
|---|---|---|---|
| 2010/0174955 A1* | 7/2010 | Carnevale ................ | G11C 5/04 714/718 |
| 2011/0041005 A1 | 2/2011 | Selinger | |
| 2014/0245105 A1 | 8/2014 | Chung et al. | |
| 2015/0067437 A1 | 3/2015 | Bains et al. | |
| 2016/0098316 A1 | 4/2016 | Lin et al. | |

(Continued)

OTHER PUBLICATIONS

ISA/KR, International Search Report and Written Opinion of the International Searching Authority, Int'l Appl. No. OCT/US2020/037188, dated Sep. 25, 2020, Korean Intellectual Property Office, Seo-gu, Daejeon, Republic of Korea, 12 pgs.

*Primary Examiner* — Yair Leibovich
(74) *Attorney, Agent, or Firm* — Holland & Hart LLP

(57) ABSTRACT

Methods, systems, and devices for a memory device with status feedback for error correction are described. For example, during a read operation, a memory device may perform an error correction operation on first data read from a memory array of the memory device. The error correction operation may generate second data and an indicator of a state of error corresponding to the second data. In one example, the indicator may indicate one of multiple possible states of error. In another example, the indicator may indicate a corrected error or no detectable error. The memory device may output the first or second data and the indicator of the state of error during a same burst interval. The memory device may output the data on a first channel and the indicator of the state of error on a second channel.

22 Claims, 9 Drawing Sheets

(56) References Cited

U.S. PATENT DOCUMENTS

2017/0160946 A1   6/2017  Kodera et al.
2018/0013450 A1*  1/2018  Hsiao .................. H03M 13/353

* cited by examiner

MEMORY DEVICE WITH STATUS FEEDBACK FOR ERROR CORRECTION

CROSS REFERENCE

The present application for patent claims the benefit of U.S. Provisional Patent Application No. 62/862,254 by SCHAEFER et al., entitled "MEMORY DEVICE WITH STATUS FEEDBACK FOR ERROR CORRECTION," filed Jun. 17, 2019, assigned to the assignee hereof, and expressly incorporated by reference herein.

BACKGROUND

The following relates generally to a system that includes at least one memory device and more specifically to memory device with status feedback for error correction.

Memory devices are widely used to store information in various electronic devices such as computers, wireless communication devices, cameras, digital displays, and the like. Information is stored by programming different states of a memory device. For example, binary devices most often store one of two states, often denoted by a logic 1 or a logic 0. In other devices, more than two states may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

In some cases, data stored within a memory device may become corrupted. Some memory devices may be configured to internally detect and/or correct such data corruption or errors (e.g., data errors) and thereby recover the data as stored before corruption. Improved techniques for reporting such detection and/or correction may be desired. Improving memory devices, generally, may include increasing memory cell density, increasing read/write speeds, increasing reliability, increasing data integrity, reducing power consumption, or reducing manufacturing costs, among other metrics.

DETAILED DESCRIPTION

Figure 1:
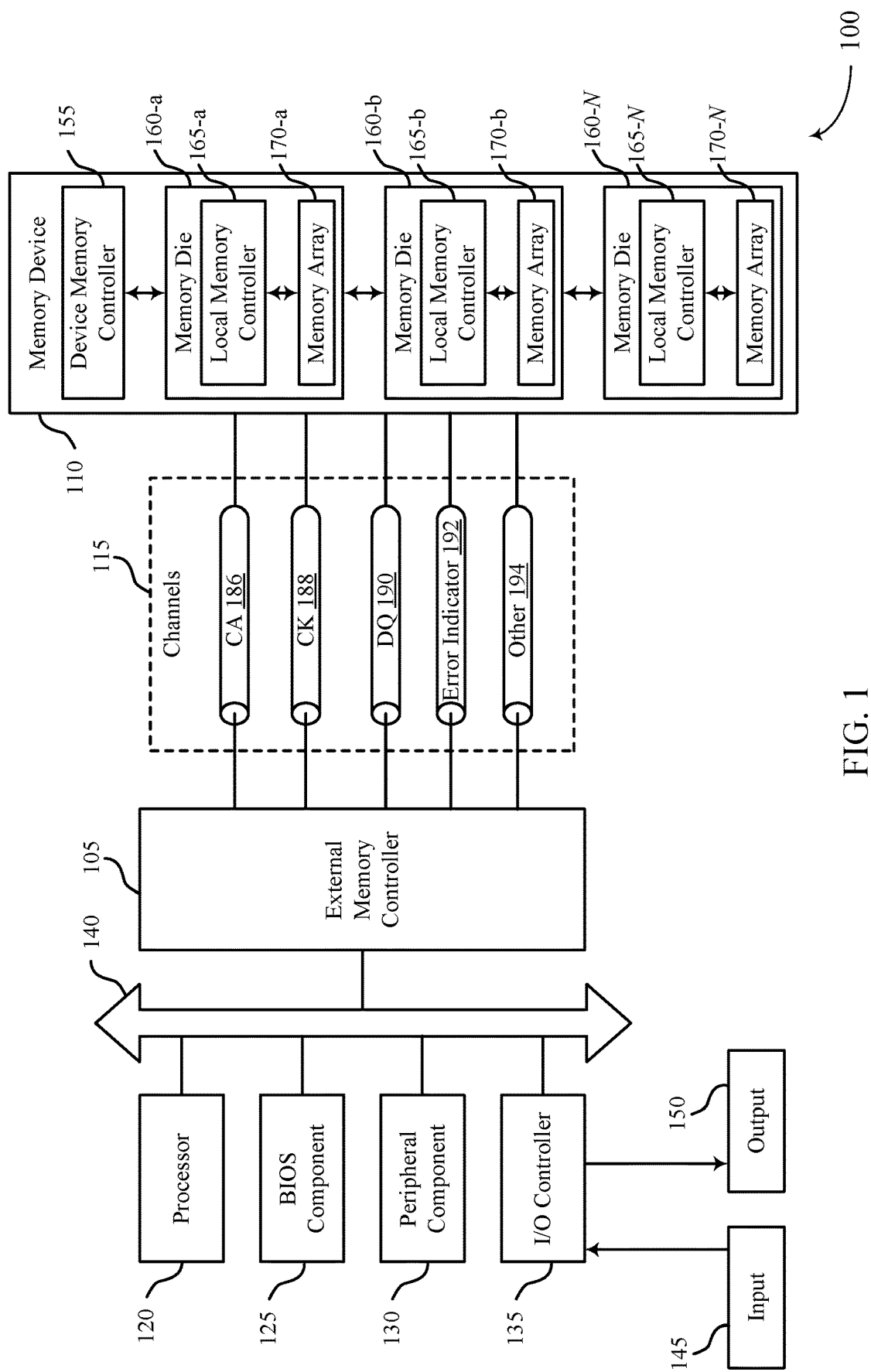
FIG. 1 illustrates an example of a system that supports a memory device with status feedback for error correction in accordance with examples as disclosed herein.

Memory devices may operate under various conditions as part of electronic apparatuses such as personal computers, wireless communication devices, servers, internet-of-things (IoT) devices, electronic components of automotive vehicles, and the like. In some cases, memory devices supporting applications for certain implementations (e.g., automotive vehicles, in some cases with autonomous or semi-autonomous driving capabilities) may be subject to increased reliability constraints. As such, memory devices (e.g., DRAM) for some applications may be expected to operate with a reliability subject to relatively higher industry standards or specifications (e.g., higher reliability constraints).

Data stored in a memory device may in some cases become corrupted (e.g., due to leakage, parasitic coupling, or electromagnetic interference (EMI)). Corruption of data may refer to an unintentional change in the logic value of data as stored within the memory device and thus may refer to an unintended change in the logic value stored by one or more memory cells (e.g., from a logic one (1) to a logic zero (0), or vice versa). For example, a memory device may perform a read operation to determine the logic value of data stored within the memory device and one or more of the memory cells may have become corrupted. A deviation in the stored logic value of a bit from its original and intended logic value may be referred as an error, a bit error, or a data error and may result from corruption. Some memory devices may be configured to internally detect and in at least some cases correct (repair) such data corruption or errors and thereby recover the data as stored before corruption. Such error detection and correction may rely upon one or more error-correcting codes (ECCs) (e.g., block codes, convolutional codes, Hamming codes, low-density parity-check codes, turbo codes, polar codes), and related processes, operations, and techniques thus may be referred as ECC processes, ECC operations, ECC techniques, or in some cases as simply ECC. Error detection and correction conducted internally within a memory device on data stored previously at the memory device may generally be referred to as in-line ECC (whether within a single-die memory device or a multi-die memory device), and memory devices that support on-die ECC may be referred to as ECC memory.

During the execution of a read operation, a memory device with ECC memory may perform an error correction operation on data read from a memory array according to the read operation. The error correction operation may generate corrected data and/or an indication of a detected error. The memory device may output data (e.g., the corrected data or the data read from the memory array) to a host device. It may be desirable to further output an indication of a status of the error correction operation. For example, it may be desirable to indicate to the host device whether the data is corrected or if an error is detected within the data. Indicating to the host device the status of the error correction operations may enable the host device to detect and address problematic data (e.g., data received from the memory device with a status indicating a detected error). This may increase the reliability of the memory device.

Techniques for a memory device with status feedback for error correction are described. The memory device may output the data (e.g., the corrected data or the data read from the memory array) and a corresponding indicator of the state of error during or concatenated with a same burst interval. The indicator of the state of error may indicate a status of the error correction operation. In one example, the indicator of the state of error may indicate one of three or more possible states of error. In another example, the indicator of the state of error may indicate that the error correction operation corrected an error or did not detect an error. The memory device may output the indicator of the state of error on a channel that is distinct from channels for the data.

Features of the disclosure are initially described in the context of a memory system and memory die as described with reference to FIGS. 1-3. Features of the disclosure are described in the context of a process flow as described with reference to FIG. 5. These and other features of the disclosure are further illustrated by and described with reference to an apparatus diagram and flowcharts that relate to memory device with status feedback for error correction as described with references to FIGS. 6-9.

FIG. 1 illustrates an example of a system 100 that utilizes one or more memory devices in accordance with examples as disclosed herein. The system 100 may include an external memory controller 105, a memory device 110, and a set of channels 115 coupling the external memory controller 105 with the memory device 110. The system 100 may include one or more memory devices, but for ease of description the one or more memory devices may be described as a single memory device 110.

The system 100 may include aspects of an electronic device, such as a computing device, a mobile computing device, a wireless device, or a graphics processing device. The system 100 may be an example of a portable electronic device. The system 100 may be an example of a computer, a laptop computer, a tablet computer, a smartphone, a cellular phone, a wearable device, an internet-connected device, or the like. The memory device 110 may be a component of the system configured to store data for one or more other components of the system 100. In some examples, the system 100 is configured for bi-directional wireless communication with other systems or devices using a base station or access point. In some examples, the system 100 is capable of machine-type communication (MTC), machine-to-machine (M2M) communication, or device-to-device (D2D) communication.

At least portions of the system 100 may be examples of a host device. Such a host device may be an example of a device that uses memory to execute processes such as a computing device, a mobile computing device, a wireless device, a graphics processing device, a computer, a laptop computer, a tablet computer, a smartphone, a cellular phone, a wearable device, an internet-connected device, some other stationary or portable electronic device, or the like. In some cases, the host device may refer to the hardware, firmware, software, or a combination thereof that implements the functions of the external memory controller 105. In some cases, the external memory controller 105 may be referred to as a host or host device. In some examples, system 100 is a graphics card.

In some cases, a memory device 110 may be an independent device or component that is configured to be in communication with other components of the system 100 and provide physical memory addresses/space to potentially be used or referenced by the system 100. In some examples, a memory device 110 may be configurable to work with at least one or a set of different types of systems 100. Signaling between the components of the system 100 and the memory device 110 may be operable to support modulation schemes to modulate the signals, different pin designs for communicating the signals, distinct packaging of the system 100 and the memory device 110, clock signaling and synchronization between the system 100 and the memory device 110, timing conventions, and/or other factors.

The memory device 110 may be configured to store data for the components of the system 100. In some cases, the memory device 110 may act as a slave-type device to the system 100 (e.g., responding to and executing commands provided by the system 100 through the external memory controller 105). Such commands may include an access command for an access operation, such as a write command for a write operation, a read command for a read operation, a refresh command for a refresh operation, or other commands. The memory device 110 may include two or more memory dice 160 (e.g., memory chips) to support a desired or specified capacity for data storage. The memory device 110 including two or more memory dice may be referred to as a multi-die memory or package (also referred to as multi-chip memory or package).

The system 100 may further include a processor 120, a basic input/output system (BIOS) component 125, one or more peripheral components 130, and an input/output (I/O) controller 135. The components of system 100 may be in electronic communication with one another using a bus 140.

The processor 120 may be configured to control at least portions of the system 100. The processor 120 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In such cases, the processor 120 may be an example of a central processing unit (CPU), a graphics processing unit (GPU), a general purpose GPU (GPGPU), or a system on a chip (SoC), among other examples.

The BIOS component 125 may be a software component that includes a BIOS operated as firmware, which may initialize and run various hardware components of the system 100. The BIOS component 125 may also manage data flow between the processor 120 and the various components of the system 100, e.g., the peripheral components 130, the I/O controller 135, etc. The BIOS component 125 may include a program or software stored in read-only memory (ROM), flash memory, or any other non-volatile memory.

The peripheral component(s) 130 may be any input device or output device, or an interface for such devices, that may be integrated into or with the system 100. Examples may include disk controllers, sound controller, graphics controller, Ethernet controller, modem, universal serial bus (USB) controller, a serial or parallel port, or peripheral card slots, such as peripheral component interconnect (PCI) or specialized graphics ports. The peripheral component(s) 130 may be other components understood by those skilled in the art as peripherals.

The I/O controller 135 may manage data communication between the processor 120 and the peripheral component(s) 130, input devices 145, or output devices 150. The I/O controller 135 may manage peripherals that are not integrated into or with the system 100. In some cases, the I/O controller 135 may represent a physical connection or port to external peripheral components.

The input 145 may represent a device or signal external to the system 100 that provides information, signals, or data to the system 100 or its components. This may include a user interface or interface with or between other devices. In some cases, the input 145 may be a peripheral that interfaces with system 100 via one or more peripheral components 130 or may be managed by the I/O controller 135.

The output 150 may represent a device or signal external to the system 100 configured to receive an output from the system 100 or any of its components. Examples of the output 150 may include a display, audio speakers, a printing device, or another processor on printed circuit board, and so forth. In some cases, the output 150 may be a peripheral that interfaces with the system 100 via one or more peripheral components 130 or may be managed by the I/O controller 135.

The components of system 100 may be made up of general-purpose or special purpose circuitry designed to carry out their functions. This may include various circuit elements, for example, conductive lines, transistors, capacitors, inductors, resistors, amplifiers, or other active or passive elements, configured to carry out the functions described herein.

The memory device 110 may include a device memory controller 155 and one or more memory dice 160. Each memory die 160 may include a local memory controller 165 (e.g., local memory controller 165-a, local memory controller 165-b, and/or local memory controller 165-N) and a memory array 170 (e.g., memory array 170-a, memory array 170-b, and/or memory array 170-N). A memory array 170 may be a collection (e.g., a grid) of memory cells, with each memory cell being configured to store at least one bit of digital data. Features of memory arrays 170 and/or memory cells are described in more detail with reference to FIG. 2.

The memory device 110 may be an example of a two-dimensional (2D) array of memory cells or may be an example of a three-dimensional (3D) array of memory cells. For example, a 2D memory device may include a single memory die 160. A 3D memory device may include two or more memory dice 160 (e.g., memory die 160-a, memory die 160-b, and/or any quantity of memory dice 160-N). In a 3D memory device, a set of memory dice 160-N may be stacked on top of one another or next to one another. In some cases, memory dice 160-N in a 3D memory device may be referred to as decks, levels, layers, or dies. A 3D memory device may include any quantity of stacked memory dice 160-N (e.g., two high, three high, four high, five high, six high, seven high, eight high). This may increase the quantity of memory cells that may be positioned on a substrate as compared with a single 2D memory device, which in turn may reduce production costs or increase the performance of the memory array, or both. In some 3D memory devices, different decks may share at least one common access line such that some decks may share at least one of a word line, a digit line, and/or a plate line.

The device memory controller 155 may include circuits or components configured to control operation of the memory device 110. As such, the device memory controller 155 may include the hardware, firmware, and software that enables the memory device 110 to perform commands and may be configured to receive, transmit, or execute commands, data, or control information related to the memory device 110. The device memory controller 155 may be configured to communicate with the external memory controller 105, the one or more memory dice 160, or the processor 120. In some cases, the memory device 110 may receive data and/or commands from the external memory controller 105. For example, the memory device 110 may receive a write command indicating that the memory device 110 is to store certain data on behalf of a component of the system 100 (e.g., the processor 120) or a read command indicating that the memory device 110 is to provide certain data stored in a memory die 160 to a component of the system 100 (e.g., the processor 120). In some cases, the device memory controller 155 may control operation of the memory device 110 described herein in conjunction with the local memory controller 165 of the memory die 160. Examples of the components included in the device memory controller 155 and/or the local memory controllers 165 may include receivers for demodulating signals received from the external memory controller 105, decoders for modulating and transmitting signals to the external memory controller 105, logic, decoders, amplifiers, filters, or the like.

The local memory controller 165 (e.g., local to a memory die 160) may be configured to control operations of the memory die 160. Also, the local memory controller 165 may be configured to communicate (e.g., receive and transmit data and/or commands) with the device memory controller 155. The local memory controller 165 may support the device memory controller 155 to control operation of the memory device 110 as described herein. In some cases, the memory device 110 does not include the device memory controller 155, and the local memory controller 165 or the external memory controller 105 may perform the various functions described herein. As such, the local memory controller 165 may be configured to communicate with the device memory controller 155, with other local memory controllers 165, or directly with the external memory controller 105 or the processor 120.

The external memory controller 105 may be configured to enable communication of information, data, and/or commands between components of the system 100 (e.g., the processor 120) and the memory device 110. The external memory controller 105 may act as a liaison between the components of the system 100 and the memory device 110 so that the components of the system 100 may not need to know the details of the memory device's operation. The components of the system 100 may present requests to the external memory controller 105 (e.g., read commands or write commands) that the external memory controller 105 satisfies. The external memory controller 105 may convert or translate communications exchanged between the components of the system 100 and the memory device 110. In some cases, the external memory controller 105 may include a system clock that generates a common (source) system clock signal. In some cases, the external memory controller 105 may include a common data clock that generates a common (source) data clock signal.

In some cases, the external memory controller 105 or other component of the system 100, or its functions described herein, may be implemented by the processor 120. For example, the external memory controller 105 may be hardware, firmware, or software, or some combination thereof implemented by the processor 120 or other component of the system 100. While the external memory controller 105 is depicted as being external to the memory device 110, in some cases, the external memory controller 105, or its functions described herein, may be implemented by a memory device 110. For example, the external memory controller 105 may be hardware, firmware, or software, or some combination thereof implemented by the device memory controller 155 or one or more local memory controllers 165. In some cases, the external memory controller 105 may be distributed across the processor 120 and the memory device 110 such that portions of the external memory controller 105 are implemented by the processor 120 and other portions are implemented by a device memory controller 155 or a local memory controller 165. Likewise, in some cases, one or more functions ascribed herein to the device memory controller 155 or local memory controller 165 may in some cases be performed by the external memory controller 105 (either separate from or as included in the processor 120).

The components of the system 100 may exchange information with the memory device 110 using a set of channels 115. In some examples, the channels 115 may enable communications between the external memory controller 105 and the memory device 110. Each channel 115 may include one or more signal paths or transmission mediums (e.g., conductors) between terminals associated with the components of system 100. For example, a channel 115 may include a first terminal including one or more pins or pads at external memory controller 105 and one or more pins or pads at the memory device 110. A pin may be an example of a conductive input or output point of a device of the system 100, and a pin may be configured to act as part of a channel.

In some cases, a pin or pad of a terminal may be part of to a signal path of the channel 115. Additional signal paths may be coupled with a terminal of a channel for routing signals within a component of the system 100. For example, the memory device 110 may include signal paths (e.g., signal paths internal to the memory device 110 or its components, such as internal to a memory die 160) that route a signal from a terminal of a channel 115 to the various components of the memory device 110 (e.g., a device memory controller 155, memory dice 160, local memory controllers 165, memory arrays 170).

Channels 115 (and associated signal paths and terminals) may be dedicated to communicating specific types of information. In some cases, a channel 115 may be an aggregated channel and thus may include multiple individual channels. For example, a data channel 190 may be x4 (e.g., including four signal paths), x8 (e.g., including eight signal paths), x16 (including sixteen signal paths), and so forth. Signals communicated over the channels may use double data rate (DDR) signaling. For example, some symbols of a signal may be registered on a rising edge of a clock signal and other symbols of the signal may be registered on a falling edge of the clock signal. Signals communicated over channels may use single data rate (SDR) signaling. For example, one symbol of the signal may be registered for each clock cycle.

In some cases, the channels 115 may include one or more command and address (CA) channels 186. The CA channels 186 may be configured to communicate commands between the external memory controller 105 and the memory device 110 including control information associated with the commands (e.g., address information). For example, the CA channel 186 may include a read command with an address of the desired data. In some cases, the CA channels 186 may be registered on a rising clock signal edge and/or a falling clock signal edge. In some cases, a CA channel 186 may include any quantity of signal paths to decode address and command data (e.g., eight or nine signal paths).

In some cases, the channels 115 may include one or more clock signal (CK) channels 188. The CK channels 188 may be configured to communicate one or more common clock signals between the external memory controller 105 and the memory device 110. Each clock signal may be configured to oscillate between a high state and a low state and coordinate the actions of the external memory controller 105 and the memory device 110.

In some cases, the clock signal may be a differential output (e.g., a CK_t signal and a CK_c signal) and the signal paths of the CK channels 188 may be configured accordingly. In some cases, the clock signal may be single ended. A CK channel 188 may include any quantity of signal paths. In some cases, the clock signal CK (e.g., a CK_t signal and a CK_c signal) may provide a timing reference for command and addressing operations for the memory device 110, or other system-wide operations for the memory device 110. The clock signal CK therefore may be variously referred to as a control clock signal CK, a command clock signal CK, or a system clock signal CK. The system clock signal CK may be generated by a system clock, which may include one or more hardware components (e.g., oscillators, crystals, logic gates, transistors, or the like).

In some cases, the channels 115 may include one or more data (DQ) channels 190. The DQ channels 190 may be configured to communicate data and/or control information between the external memory controller 105 and the memory device 110. For example, the DQ channels 190 may communicate information (e.g., bi-directional) to be written to the memory device 110 or information read from the memory device 110.

In some cases, an indication of a state of error associated with data of a read operation may be communicated using one or more of the channels 115. That is, the memory device 110 may perform an in-line error correction operation on data associated with a read operation. The indicator of the state of error may indicate a status of an error correction operation associated with the data. The indicator of the state of error may be communicated over the one or more error indicator channels 192. In some cases, the error indicator channel 192 may correspond to a channel dedicated for the indication of the state of error. In some other cases, the error indicator channel 192 may correspond to another channel. For example, the error indicator channel 192 may be a data mask/invert (DMI) pin or a channel for impedance calibration of the one or more DQ channels 190 (e.g., a ZQ channel). Additionally or alternatively, the memory device 110 may communicate the indicator of the state of error via the one or more DQ channels 190. For example, the memory device 110 may communicate the indicator of the state of error by the DQ channels 190 after (e.g., contiguous with or separated by one or more clock cycles) a burst interval for communicating the data associated with the read command to the external memory controller 105.

In some cases, the channels 115 may include one or more other channels 194 that may be dedicated to other purposes. These other channels 194 may include any quantity of signal paths.

In some cases, the other channels 194 may include one or more write clock signal (WCK) channels. While the 'W' in WCK may nominally stand for "write," a write clock signal WCK (e.g., a WCK_t signal and a WCK_c signal) may provide a timing reference for access operations generally for the memory device 110 (e.g., a timing reference for both read and write operations). Accordingly, the write clock signal WCK may also be referred to as a data clock signal WCK. The WCK channels may be configured to communicate a common data clock signal between the external memory controller 105 and the memory device 110. The data clock signal may be configured to coordinate an access operation (e.g., a write operation or read operation) of the external memory controller 105 and the memory device 110.

In some cases, the write clock signal may be a differential output (e.g., a WCK_t signal and a WCK_c signal) and the signal paths of the WCK channels may be configured accordingly. A WCK channel may include any quantity of signal paths. The data clock signal WCK may be generated by a data clock, which may include one or more hardware components (e.g., oscillators, crystals, logic gates, transistors, or the like).

In some cases, the other channels 194 may include one or more error detection code (EDC) channels. The EDC channels may be configured to communicate error detection signals, such as checksums, to improve system reliability. An EDC channel may include any quantity of signal paths.

The channels 115 may couple the external memory controller 105 with the memory device 110 using a variety of different architectures. Examples of the various architectures may include a bus, a point-to-point connection, a crossbar, a high-density interposer such as a silicon interposer, or channels formed in an organic substrate or some combination thereof. For example, in some cases, the signal paths may at least partially include a high-density interposer, such as a silicon interposer or a glass interposer.

Signals communicated over the channels 115 may be modulated using a variety of different modulation schemes. In some cases, a binary-symbol (or binary-level) modulation scheme may be used to modulate signals communicated between the external memory controller 105 and the memory device 110. A binary-symbol modulation scheme may be an example of a M-ary modulation scheme where M is equal to two. Each symbol of a binary-symbol modulation scheme may be configured to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and/or others.

In some cases, a multi-symbol (or multi-level) modulation scheme may be used to modulate signals communicated between the external memory controller 105 and the memory device 110. A multi-symbol modulation scheme may be an example of a M-ary modulation scheme where M is greater than or equal to three. Each symbol of a multi-symbol modulation scheme may be configured to represent more than one bit of digital data (e.g., a symbol may represent a logic 00, a logic 01, a logic 10, or a logic 11). Examples of multi-symbol modulation schemes include, but are not limited to, PAM4, PAM8, etc., quadrature amplitude modulation (QAM), quadrature phase shift keying (QPSK), and/or others. A multi-symbol signal or a PAM4 signal may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

The memory device 110 may be configured to perform an error correction operation on data read from a memory array 170 according to a read command (e.g., as received from the external memory controller 105). The error correction operation may generate corrected data and/or an indication of a detected error. The memory device 110 may output data (e.g., the corrected data or the data read from the memory array) to the external memory controller 105 during a burst interval. The memory device 110 may also output an indication of a status of the error correction operation during the same burst interval. In one example, the indicator of the state of error may indicate one of three or more possible states of error. In another example, the indicator of the state of error may indicate that the error correction operation corrected an error or did not detect an error.

Figure 2:
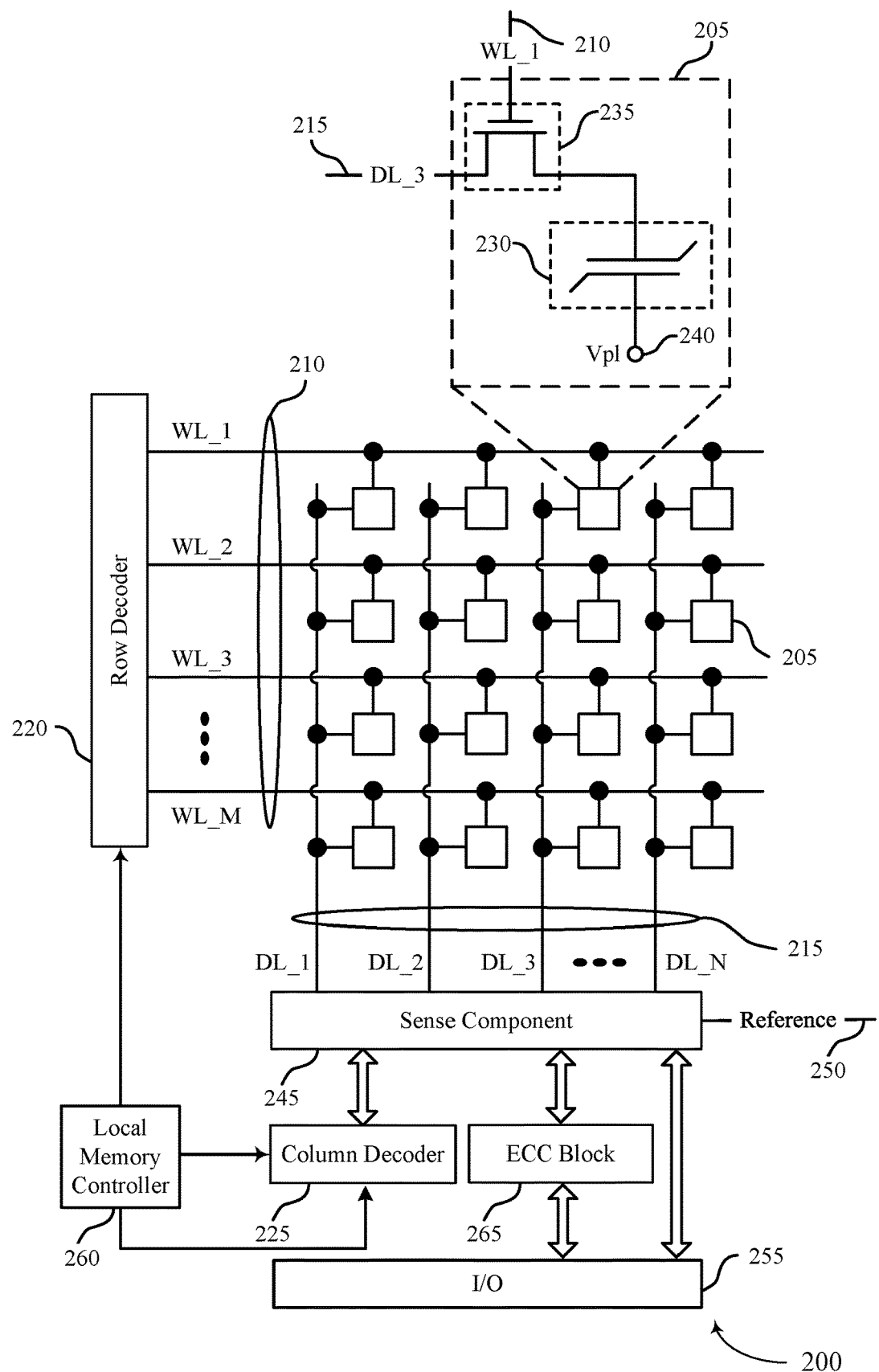
FIG. 2 illustrates an example of a memory die that supports a memory device with status feedback for error correction in accordance with examples as disclosed herein.

FIG. 2 illustrates an example of a memory die 200 in accordance with examples as disclosed herein. The memory die 200 may be an example of the memory dice 160 described with reference to FIG. 1. In some cases, the memory die 200 may be referred to as a memory chip, a memory device, or an electronic memory apparatus. The memory die 200 may include one or more memory cells 205 that are programmable to store different logic states. Each memory cell 205 may be programmable to store two or more states. For example, the memory cell 205 may be configured to store one bit of digital logic at a time (e.g., a logic 0 and a logic 1). In some cases, a single memory cell 205 (e.g., a multi-level memory cell) may be configured to store more than one bit of digit logic at a time (e.g., a logic 00, logic 01, logic 10, or a logic 11).

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed.

Operations such as reading and writing may be performed on memory cells 205 by activating or selecting access lines such as a word line 210 and/or a digit line 215. In some cases, digit lines 215 may also be referred to as bit lines. References to access lines, word lines and digit lines, or their analogues, are interchangeable without loss of understanding or operation. Activating or selecting a word line 210 or a digit line 215 may include applying a voltage to the respective line.

The memory die 200 may include the access lines (e.g., the word lines 210 and the digit lines 215) arranged in a grid-like pattern. Memory cells 205 may be positioned at intersections of the word lines 210 and the digit lines 215. By biasing a word line 210 and a digit line 215 (e.g., applying a voltage to the word line 210 or the digit line 215), a single memory cell 205 may be accessed at their intersection.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address. For example, the memory die 200 may include multiple word lines 210, labeled WL_1 through WL_M, and multiple digit lines 215, labeled DL_1 through DL_N, where M and N depend on the size of the memory array. Thus, by activating a word line 210 and a digit line 215, e.g., WL_1 and DL_3, the memory cell 205 at their intersection may be accessed. The intersection of a word line 210 and a digit line 215, in either a two-dimensional or three-dimensional configuration, may be referred to as an address of a memory cell 205.

The memory cell 205 may include a logic storage component, such as capacitor 230 and a switching component 235. The capacitor 230 may be an example of a dielectric capacitor or a ferroelectric capacitor. A first node of the capacitor 230 may be coupled with the switching component 235 and a second node of the capacitor 230 may be coupled with a voltage source 240. In some cases, the voltage source 240 may be the cell plate reference voltage, such as Vpl, or may be ground, such as Vss. In some cases, the voltage source 240 may be an example of a plate line coupled with a plate line driver. The switching component 235 may be an example of a transistor or any other type of switch device that selectively establishes or de-establishes electronic communication between two components.

Selecting or deselecting the memory cell 205 may be accomplished by activating or deactivating the switching component 235. The capacitor 230 may be in electronic communication with the digit line 215 using the switching component 235. For example, the capacitor 230 may be isolated from digit line 215 when the switching component 235 is deactivated, and the capacitor 230 may be coupled with digit line 215 when the switching component 235 is activated. In some cases, the switching component 235 is a transistor and its operation may be controlled by applying a voltage to the transistor gate, where the voltage differential between the transistor gate and transistor source may be greater or less than a threshold voltage of the transistor. In some cases, the switching component 235 may be a p-type transistor or an n-type transistor. The word line 210 may be in electronic communication with the gate of the switching component 235 and may activate/deactivate the switching component 235 based on a voltage being applied to word line 210.

A word line 210 may be a conductive line in electronic communication with a memory cell 205 that is used to perform access operations on the memory cell 205. In some architectures, the word line 210 may be in electronic communication with a gate of a switching component 235 of a memory cell 205 and may be configured to control the switching component 235 of the memory cell. In some architectures, the word line 210 may be in electronic communication with a node of the capacitor of the memory cell 205 and the memory cell 205 may not include a switching component.

A digit line 215 may be a conductive line that connects the memory cell 205 with a sense component 245. In some architectures, the memory cell 205 may be selectively coupled with the digit line 215 during portions of an access operation. For example, the word line 210 and the switching component 235 of the memory cell 205 may be configured to couple and/or isolate the capacitor 230 of the memory cell 205 and the digit line 215. In some architectures, the memory cell 205 may be in electronic communication (e.g., constant) with the digit line 215.

The sense component 245 may be configured to detect a state (e.g., a charge) stored on the capacitor 230 of the memory cell 205 and determine a logic state of the memory cell 205 based on the stored state. The charge stored by a memory cell 205 may be extremely small, in some cases. As such, the sense component 245 may include one or more sense amplifiers to amplify the signal output by the memory cell 205. The sense amplifiers may detect small changes in the charge of a digit line 215 during a read operation and may produce signals corresponding to a logic state 0 or a logic state 1 based on the detected charge. During a read operation, the capacitor 230 of memory cell 205 may output a signal (e.g., discharge a charge) to its corresponding digit line 215. The signal may cause a voltage of the digit line 215 to change. The sense component 245 may be configured to compare the signal received from the memory cell 205 across the digit line 215 to a reference signal 250 (e.g., reference voltage). The sense component 245 may determine the stored state of the memory cell 205 based on the comparison. For example, in binary-signaling, if digit line 215 has a higher voltage than the reference signal 250, the sense component 245 may determine that the stored state of memory cell 205 is a logic 1 and, if the digit line 215 has a lower voltage than the reference signal 250, the sense component 245 may determine that the stored state of the memory cell 205 is a logic 0. The sense component 245 may include various transistors or amplifiers to detect and amplify a difference in the signals. The detected logic state of memory cell 205 may be output through ECC block 265 by I/O 255. Here, the ECC block 265 may perform an error correction operation on the detected logic state of memory cell 205 and output data (e.g., the original data or corrected data) by I/O 255. In some other cases, the detected logic state of memory cell 205 may bypass ECC block 265 and be output by I/O 255. In some cases, the detected logic state of memory cell 205 may be output through the ECC block 265 and around ECC block 265 by I/O 255. Here, the detected logic state of memory cell 205 may be output from the memory die 200 at a same time as ECC block 265 performs an error correction operation on the detected logic state of memory cell 205. In some cases, the sense component 245 may be part of another component (e.g., a column decoder 225, row decoder 220). In some cases, the sense component 245 may be in electronic communication with the row decoder 220 or the column decoder 225.

The local memory controller 260 may control the operation of memory cells 205 through the various components (e.g., row decoder 220, column decoder 225, and sense component 245, ECC block 265). The local memory controller 260 may be an example of the local memory controller 165 described with reference to FIG. 1. In some cases, one or more of the row decoder 220, column decoder 225, sense component 245, and ECC block 265 may be co-located with the local memory controller 260. The local memory controller 260 may be configured to receive commands and/or data from an external memory controller 105 (or a device memory controller 155 described with reference to FIG. 1), translate the commands and/or data into information that can be used by the memory die 200, perform one or more operations on the memory die 200, and communicate data from the memory die 200 to the external memory controller 105 (or the device memory controller 155) in response to performing the one or more operations. The local memory controller 260 may generate row and column address signals to activate the target word line 210 and the target digit line 215. The local memory controller 260 may also generate and control various voltages or currents used during the operation of the memory die 200. In general, the amplitude, shape, or duration of an applied voltage or current discussed herein may be adjusted or varied and may be different for the various operations discussed in operating the memory die 200.

In some cases, the local memory controller 260 may be configured to perform a write operation (e.g., a programming operation) on one or more memory cells 205 of the memory die 200. During a write operation, a memory cell 205 of the memory die 200 may be programmed to store a desired logic state. In some cases, a set of memory cells 205 may be programmed during a single write operation. The local memory controller 260 may identify a target memory cell 205 on which to perform the write operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The local memory controller 260 may apply a specific signal (e.g., voltage) to the digit line 215 during the write operation to store a specific state (e.g., charge) in the capacitor 230 of the memory cell 205, the specific state (e.g., charge) may be indicative of a desired logic state.

The ECC block 265 or the local memory controller 260 may perform one or more error correction operations on data received from the host device as part of a write operation. For example, the ECC block 265 may receive data from the host device as part of a write operation. The ECC block 265 may determine or generate error detection or correction information associated with the data. In some cases, the ECC block 265 may include error detection logic or may cause error detection logic (not shown) to perform the error detection operations described herein. The ECC block 265 may cause the data and the error detection or correction information to be stored in one or more memory cells 205 as part of the write operation. In another example, the ECC block 265 may receive data and associated error detection or correction information from a memory array as part of a read operation. The ECC block 265 may perform an error correction operation based on the data and the error detection or correction information. Performing an error correction operation at the memory device (e.g., by the ECC block 265 or the local memory controller 260) may improve the reliability of the memory device.

The ECC block 265 or the local memory controller 260 may generate an indicator of a status of the error correction operation. The indicator may indicate a state of error of the data. For example, the indicator may indicate a type of error correction or a type of error detected during the error correction operation. For example, the indicator of the state of error may indicate one of three or more possible states of error. In another example, the indicator of the state of error may indicate that the error correction operation corrected an error or did not detect an error.

In some cases, the local memory controller 260 may be configured to perform a read operation (e.g., a sense operation) on one or more memory cells 205 of the memory die 200. During a read operation, the logic state stored in a memory cell 205 of the memory die 200 may be determined. In some cases, a set of memory cells 205 may be sensed during a single read operation. The local memory controller 260 may identify a target memory cell 205 on which to perform the read operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The target memory cell 205 may transfer a signal to the sense component 245 in response to biasing the access lines. The sense component 245 may amplify the signal. The local memory controller 260 may fire the sense component 245 (e.g., latch the sense component) and thereby compare the signal received from the memory cell 205 to the reference signal 250. Based on that comparison, the sense component 245 may determine a logic state that is stored on the memory cell 205. The local memory controller 260 may communicate the logic state stored on the memory cell 205 to the external memory controller 105 (or the device memory controller 155) as part of the read operation.

As the logic state stored on the memory cell 205 is communicated between a host device and a memory device, the data may be corrupted. The local memory controller 260 or the ECC block 265 may generate an error correcting code to be used to detect and/or correct some of these errors. Error correction used to detect or correct errors that occur during the transmission of data over channels between the memory device and a host device or external memory controller may be referred to as link ECC. The local memory controller 260 or the ECC block 265 may communicate the error correcting code to the external memory controller 105 (e.g., in addition to the logic state stored on the memory cell 205) as part of the read operation. The local memory controller 260 or the ECC block 265 may receive an error correcting code from the external memory controller 105 as part of a write operation and detect or correct errors that occurred during transmission of the data associated with the write operation.

In some memory architectures, accessing the memory cell 205 may degrade or destroy the logic state stored in a memory cell 205. For example, a read operation performed in DRAM architectures may partially or completely discharge the capacitor of the target memory cell. The local memory controller 260 may perform a re-write operation or a refresh operation to return the memory cell to its original logic state. The local memory controller 260 may re-write the logic state to the target memory cell after a read operation. In some cases, the re-write operation may be considered part of the read operation. Additionally, activating a single access line, such as a word line 210, may disturb the state stored in some memory cells in electronic communication with that access line. Thus, a re-write operation or refresh operation may be performed on one or more memory cells that may not have been accessed.

Figure 3:
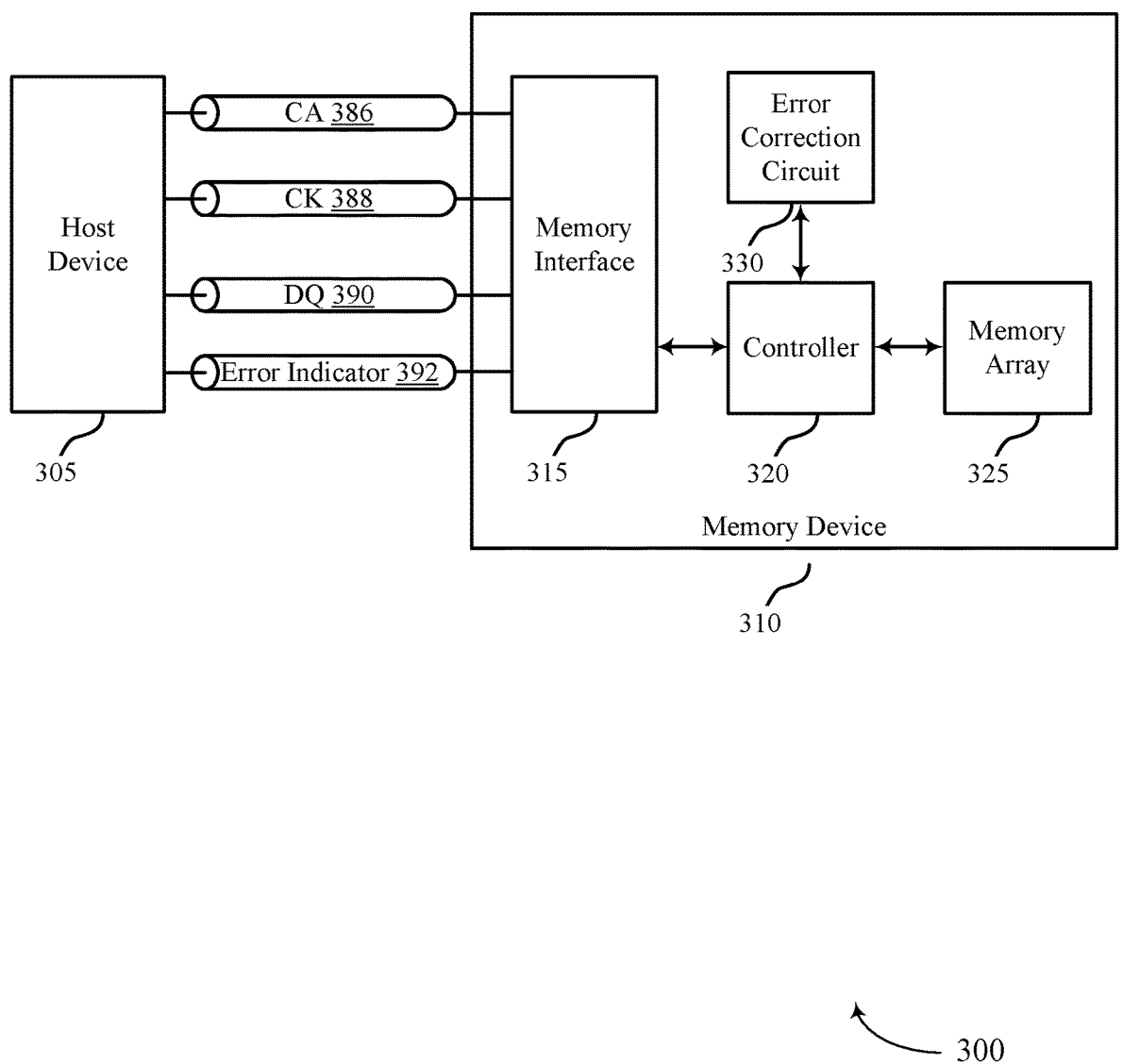
FIG. 3 illustrates an example of a system that supports a memory device with status feedback for error correction in accordance with examples as disclosed herein.

FIG. 3 illustrates an example of a system 300 that supports a memory device with status feedback for error correction in accordance with examples as disclosed herein. The system 300 may include one or more components described herein with reference to FIGS. 1 and 2, among others. For example, the system 300 may include a host device 305, which may be an example of the external memory controller 105 as described with reference to FIG. 1; a memory device 310, which may be an example of the memory device 110, the memory dice 160, or the memory die 200 as described with reference to FIGS. 1 and 2; a controller 320, which may be an example of the device memory controller 155, one or more local memory controllers 165, or the local memory controller 260 as described with reference to FIGS. 1 and 2, or any combination thereof; a memory array 325, which may be an example of the memory arrays 170 as described with reference to FIG. 1; an error correction circuit 330 which may be an example of the local memory controller 260 or the ECC block 265 as described with reference to FIG. 2; and CA channels 386, CK channels 388, DQ channels 390, and error indicator channels 392, which may be examples of the corresponding channels as discussed with reference to FIG. 1. The memory device 310 may also include a memory interface 315.

Host device 305 may send commands to memory device 310 by CA channel 386, which may be received via the memory interface 315. The commands may include access commands to perform one or more access operations (e.g., a read operation, a write operation) at the memory array 325. The controller 320 may receive commands from the memory interface 315, process the commands, and execute the commands on memory array 325. The error correction circuit 330 may perform one or more error correction operations on data associated with the access commands.

During a write operation, the host device 305 may send a write command to the memory interface 315 by CA channel 386. The write command may include data to be written to the memory array 325. The memory interface 315 may send the data to the controller 320 which may in turn communicate the data to the error correction circuit 330. The error correction circuit 330 may generate error detection or correction information based on the data received from controller 320. For example, the error correction circuit 330 may generate parity or Hamming code information based on the data. The error correction circuit 330 may communicate the error detection or correction information to the controller 320 to be stored at the memory array 325 with the data. The controller 320 may store the data at the memory array 325 (e.g., at a location indicated by the write command received from the host device 305). The controller 320 may also store the error detection or correction information at the memory array 325. In some cases, the error detection or correction information may be stored at a same location as the data (e.g., a same sub-array, a same row). In some other cases, the error detection or correction information may be stored at a different portion of the memory array 325 than the data.

During a read operation, the host device 305 may send a read command to the memory interface 315 by CA channel 386. The read command may indicate data to be read from the memory array 325. The memory interface 315 may communicate the read command to the controller 320 which may in turn read the data (e.g., the first data) from the memory array 325. The controller 320 may also read error detection or correction information (e.g., that is associated with the data) from the memory array 325. The controller 320 may communicate both the data and the error detection or correction information to the error correction circuit 330. The error correction circuit 330 may perform an error correction operation based on the data to detect and/or correct errors associated with the data (e.g., due to leakage, parasitic coupling, or EMI). During the error correction operation, the error correction circuit 330 may generate error detection or correction information based on the data received from the controller 320. The error correction circuit 330 may compare the received error detection or correction information with the generated error detection or correction information. In the event that the received error detection or correction information and the generated error detection or correction information do not match, the error correction circuit 330 may detect an error.

The error correction operation may detect and/or correct various types of errors based on a type of the error correction operation. In a first case, the error correction operation may not detect any errors. In a second case, the error correction operation may detect an error but not correct the error. For example, the error correction operation may detect a double-bit error (e.g., during a SECDED operation), detect a triple-bit uncorrected error, detect an odd uncorrected error (e.g., an error corresponding to an odd quantity of inverted bits within the data), detect even uncorrected errors (e.g., an error corresponding to an even quantity of inverted bits within the data), or detect an aliased error. In a third case, the error correction operation may correct an error. For example, the error correction operation may correct a single-bit error (e.g., during a single error correction (SEC) SEC or SEC double error detection (SECDED) operation), correct a triple-bit error, correct an odd error, or correct an even error.

Each of the types of error detection and/or correction may be classified into a state of error. That is, there may be a finite possible states of error and the error correction circuit 330 may determine, based on the error correction operation, a state of error associated with the data. The quantity of possible states of errors and/or the possible states of errors may be variable. In some cases, the states of errors may be a preconfigured characteristic of the memory device 310 (e.g., hardwired on the memory device 310 or set during initialization). In some other cases, the states of errors may be programmable (e.g., by the host device 305).

There may be two possible states of error. For example, the two states of error may be (1) no error/undetectable error or (2) a corrected error. In a second example, the two possible states of error may correspond to (1) no error/undetectable error/corrected error or (2) an aliased third error. In the first two examples, the error correction circuit 330 may determine the state of error (e.g., between the two possible states of errors) based on performing an SEC operation. That is, the error correction circuit 330 may perform an SEC operation that indicates whether there is (1) no error or an undetectable error (2) a corrected error or (3) an aliased error. The error correction circuit 330 may categorize a subset or all of the types of errors into two error categories. For example, the two categories may be whether there is (1) no error or an undetectable error versus (2) a corrected error, or whether there is (1) no error/undetectable error/corrected error versus (2) an aliased third error. In a third example, the two categories of error may be (1) no error/correctable error or (2) an uncorrectable error. In some cases, the error correction circuit 330 may not determine between (1) the no error/correctable error and (2) the uncorrectable error based on an SEC error correction operation. In this case, the SEC error correction operation may not indicate an uncorrectable error. The error correction circuit 330 may output an indicator of the category of error.

In some other cases, error correction circuit 330 may output an indicator that indicates one of more than two categories for states of error. For example, there may be three possible states of error corresponding to (1) no error/undetectable error, (2) a corrected error, or (3) an uncorrected error. In a second example, there may be three possible states of error corresponding to (1) no error detected, (2) a corrected error, or (3) an uncorrected error. Where additional error information is available, for example for ECC more complex than SEC, there may be more than three possible states of error. For example, the possible states of error may include (1) no error detected, (2) a correcting single-bit error, (3) a detected double-bit error, (4) a corrected triple-bit error, (5) a detected triple-bit uncorrected error, (6) a corrected odd error, (7) a detected odd uncorrected error, (8) a corrected even error, or (9) a detected even uncorrected error. The error correction circuit 330 may categorize a subset or all of the errors into two, or more (e.g., up to the total possible states of error) error categories for generating the indicator of the error.

The error correction circuit 330 may output data (e.g., second data) to the controller 320 based on the error correction operation. In some cases, the second data may be corrected data generated by performing the error correction operation on the data read from the memory array 325. In some other cases, the second data may be the same as the data read from the memory array 325 (e.g., the error correction circuit 330 did not correct any errors during the error correction operation). The error correction circuit 330 may also communicate an indicator of the state of error to the controller 320. Alternatively, the error correction circuit 330 may communicate, to the controller 320, an indicator of the type or category of error detected and/or corrected during the error correction operation. Based on the type or category of error detected and/or corrected, the controller 320 may determine the state of error associated with the data.

The controller 320 may communicate either the first data or the second data to the memory interface 315. The memory interface 315 may in turn output the data (e.g., the first data or the second data) to the host device 305 by the DQ channel 390 according to a burst interval. The burst interval may correspond to a quantity of clock cycles (e.g., based on the WCK as discussed with reference to FIG. 1) to output the data by the DQ channel 390 to the host device 305.

The controller 320 may communicate the indicator of the state of error to the memory interface 315. The memory interface 315 may output the indicator of the state of error during the same burst interval (e.g., as the data). In some cases, the memory interface 315 may communicate the indicator of the state of error by the DQ channel 390. Here, the memory interface 315 may serially output the indicator of the state of error to a backend of the data during the burst interval. In another case, the memory interface 315 may communicate the indicator of the state of error by an error indicator channel 392. In some cases, the error indicator channel 392 may be dedicated for the indication of the state of error. Here, the memory interface 315 may be a flag. For example, the memory interface 315 may indicate one of two possible states of error by setting the flag to one of two possible values.

Alternatively, the error indicator channel 392 may be a multi-functional channel. For example, the error indicator channel 392 may be a DMI pin. If the error indicator channel 392 is a DMI pin, the memory interface 315 may output the indicator of the state of error during a first portion of the burst interval. For example, the memory interface 315 may output the indicator of the state of error during the first seven (7) clock cycles of a sixteen (16) cycle burst interval. Here, the seven (7) clock cycles may provide up to $2^7$ possible indications of the state of error. In some cases, each clock cycle may correspond to a state of error (e.g., each bit corresponds to a flag associated with a specific state of error) to indicate a total of seven (7) different states of error. In some other cases, there may be up to $2^7$ possible states of error, where a combination of bits corresponds to a state of error. In another example, the error indicator channel 392 may be a ZQ channel (e.g., a channel associated with impedance calibration for the DQ channel 390) outside of ZQ calibration. The indicator of the state of error may be coded (e.g., three (3) types or categories of error coded to four (4) or more bits).

Depending on a functionality of the error indicator channel 392, the memory interface 315 may utilize varying amounts of the burst interval to output the indicator of the state of error (e.g., a first portion of the burst interval, a second portion of the burst interval, the entire burst interval). This may allow for a high possible degree of granularity of the possible states of errors. For example, if the burst interval is sixteen (16) cycles and the entire burst interval is available for outputting the indicator of the state of error, the memory interface 315 may output a sixteen (16) bit indicator of the state of error. Therefore, there may be up to $2^{16}$ possible states of error indicated. Alternatively, there may be less than $2^{16}$ possible states of error, but with a higher degree of redundancy (e.g., the indicator may be transmitted more than one time or coded).

The error indicator channel 392 may include information in addition to the indicator of the state of error. For example, the error indicator channel 392 may indicate information related to detected row hammer events, refresh rate parameters for the memory device 310, or a mode of operation associated with the memory device 310. the mode of operation may include an indication of whether the memory device 310 is operating according to a safe mode. The safe mode may correspond to a restriction of the operation of the memory device 310 (e.g., by limiting the type of commands executed, by limiting the portion of a memory array 325 of the memory device 310 for executing commands).

The memory interface 315 may output the indicator of the state of memory to a mode register (e.g., that may be polled by the host device 305). The memory interface 315 may also store the second data at a mode register for later retrieval. The memory interface 315 may store the indicator the state of memory at the mode register and output the indicator of the state of error by a channel to the host device 305.

By providing the memory device 310 with a method for communicating multiple different possible states of error, the system 300 may operate with a higher reliability. Indicating a state of error with more granularity (e.g., indicating a state of error from a larger quantity of possible states of error) may provide the host device 305 with more information regarding the reliability of the data received from the memory device 310 during the read operation. This may further improve the reliability of the memory system 300.

Figure 4:
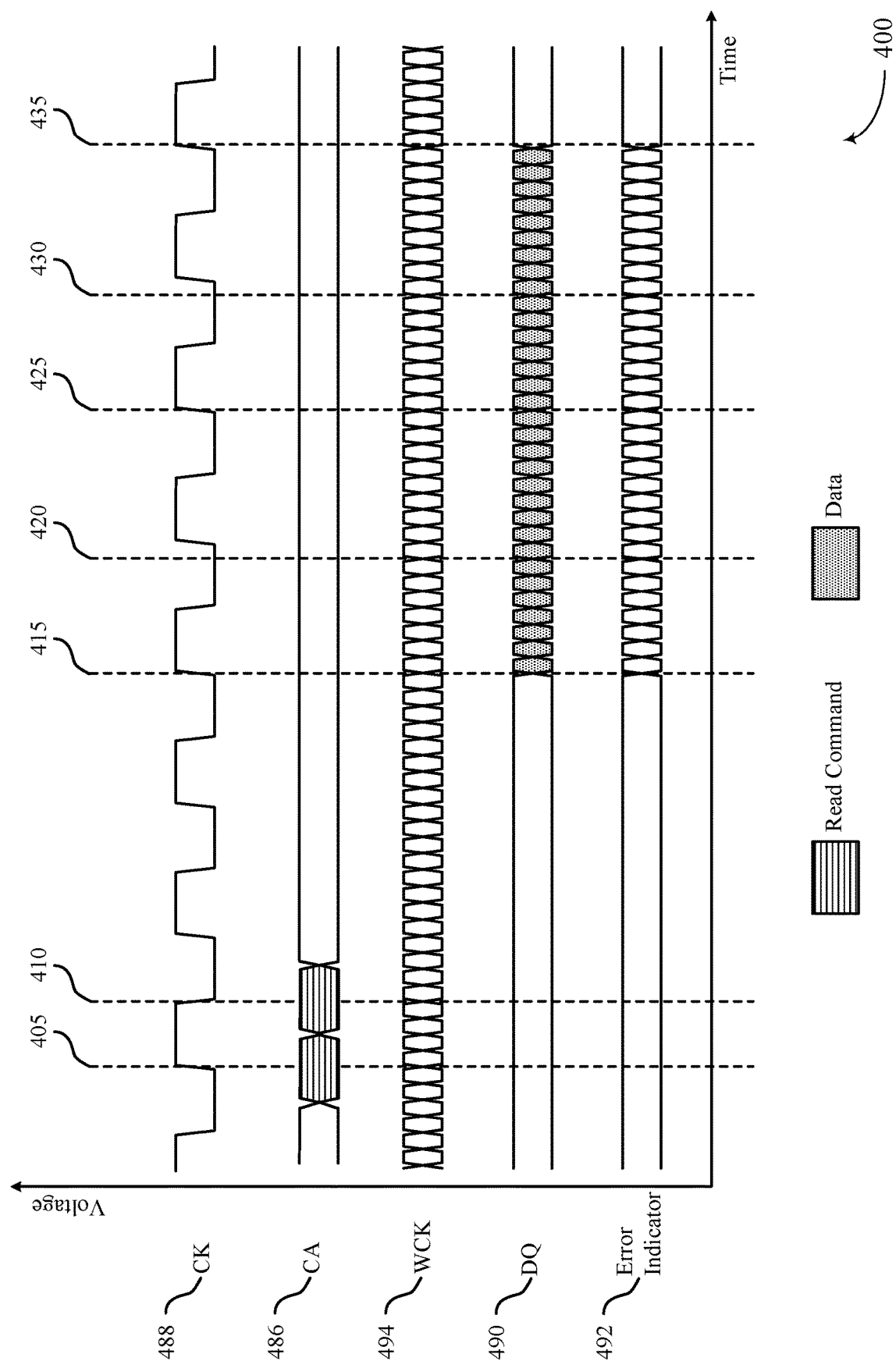
FIG. 4 illustrates an example of a timing diagram that supports a memory device with status feedback for error correction in accordance with examples as disclosed herein.

FIG. 4 illustrates an example of a timing diagram 400 that supports a memory device with status feedback for error correction in accordance with examples as disclosed herein. The timing diagram 400 illustrates procedures of read operation to output data stored at a memory array 325. The timing diagram 400 shows various logical states (e.g., which may correspond to voltage levels as a function of time) associated with the channels between a host device 305 and a memory device 310 as described with reference to FIG. 3. Thus, the timing diagram 400 may illustrate the signal transmission on one or more channels described herein with reference to FIGS. 1, 2, and 3. Specifically, timing diagram 400 may illustrate the signal transmissions on one or more channels during a read operation when the memory device outputs an indicator of the state of error by an error indicator channel. The time and voltage scales used in FIG. 4 are for illustration purposes only and may not necessarily depict particular values in some cases. The timing diagram 400 includes a CK channel 488, a CA channel 386, a WCK channel 494, a DQ channel 490, and an error indicator channel 492, which may be examples of the corresponding channels as discussed with reference to FIG. 1 and FIG. 3.

At time 405, a memory device may receive a first read command from a host device by the CA channel 486. The memory device may receive the read command at the transition of the signal on the CK channel 488. At time 410, the memory device may receive a second read command from the host device by the CA channel 486.

At time 415, the memory device may begin outputting, by the DQ channel 490, data corresponding to the first read operation. The memory device may output the data according to the timing reference provided by the WCK channel 494. The time between time 405 and time 415 may correspond to a latency associated with the first read operation. The memory device may output the data corresponding to the read operation during a burst interval from time 415 to time 425. Here, the burst interval may correspond to sixteen (16) cycles (e.g., as indicated by the signal on WCK channel 494). If the DQ channel 490 has a width of eight (8) (e.g., includes eight (8) pins), the read operation may correspond to 128 bits of data. In some cases, the DQ channel may have a width of sixteen (16). Here, the read operation may correspond to 256 bits of data.

During the burst interval from time 415 to time 425, the memory device may output an indicator of the state of error (e.g., corresponding to the data on the DQ channel 490 from time 415 to time 425) to the host device by the error indicator channel 492. The error indicator channel 492 may be a multi-functional channel. In some cases, the error indicator channel 492 may be a DMI pin. When the error indicator channel 492 corresponds to a DMI pin, a portion of the burst interval (e.g., from time 420 to time 425) may be used for other communications. For example, the last nine (9) bits on DMI pin may include link ECC information. That is, the memory device may perform an SEC or SECDED operation to generate error detection and correction information for link ECC and output the error detection and correction information within a last portion (e.g., the last nine (9) bits) of the burst interval.

If the error indicator channel 492 is a DMI pin, the signal output by the error indicator channel 492 from time 415 to time 420 may be an indicator the state of error. That is, a first portion (e.g., the first seven (7) of the sixteen (16) bits) of the burst interval may indicate the state of error while a second portion (e.g., the last nine (9) bits indicates link ECC information. In some cases, each bit of the first portion may be the same. Here, the indicator of the state of error may indicate one of two possible states of error. In some other cases, there may be less redundancy allowing for more possible states of error or the indicator to be output on a subset of the first portion of the burst interval. In some cases, the state of error may be output in a different portion of the bits of the burst interval (e.g., other than the first portion of the burst interval).

For example, determining the state of error may involve more time than is available prior to the burst interval and may not be output at the beginning of the burst interval. Therefore, the state of error may be output in a last portion, or in bits that may be distributed throughout the burst interval (e.g., in-between the link ECC bits, in a comb pattern). If the DQ channel has a width that satisfies a threshold (e.g., sixteen (16)), the error indicator channel 492 may include more than one DMI pin, where each of the DMI pins corresponds to a distinct set (e.g., eight (8) pins) of the DQ channel 490. Therefore, the error indicator channel 492 may indicate a state of error for half of the data output by the DQ channel 490.

The error indicator channel 492 may be a different type of channel (e.g., a ZQ channel). Depending on a functionality of the error indicator channel 492, the error indicator channel 492 may include a varying quantity of bits indicating the state of error. This may allow for a high possible degree of granularity of the possible states of errors. For example, if the entire burst interval is available for outputting the indicator of the state of error, the entire signal on the error indicator channel 492 from time 415 to time 425 may correspond to an indication of the state of error. Therefore, there may be up to $2^N$ possible states of error indicated, where N is the quantity of cycles in the burst interval. Alternatively, there may be less than $2^N$ possible states of error, but with a higher degree of redundancy (e.g., the indicator may be transmitted more than one time or coded).

In some cases, the indicator of the state of error may be output by the DQ channel 490 instead of by the error indicator channel 492. For example, after the data for the read operation has been output by the DQ channel 490 at time 425, the DQ channel 490 may output an indicator of the state of error associated with the data. If the DQ channel 490 includes eight (8) data pins, one or more of the data pins may output an indicator of the state of error in the clock cycle following time 425 (e.g., the 17th clock cycle for a burst length of sixteen (16)).

If the indicator of the state of error is being output by the error indicator channel 492, the memory device may begin outputting, by the DQ channel 490, data corresponding to the second read operation at time 425. The time between 410 and 425 may correspond to a latency associated with the second read operation. The memory device may output the data corresponding to the read operation during a burst interval from time 425 to time 435. Again, the burst interval may correspond to sixteen (16) cycles (e.g., as indicated by the signal on WCK channel 494). During the burst interval from time 425 to time 435, the memory device may output an indicator of the state of error (e.g., corresponding to the data on the DQ channel 490 from time 425 to time 435) to the host device by the error indicator channel 492. If the error indicator channel 492 corresponds to a DMI pin, the indicator of the state of error may be output during the first seven (7) cycles of the burst interval from time 425 to time 430.

Figure 5:
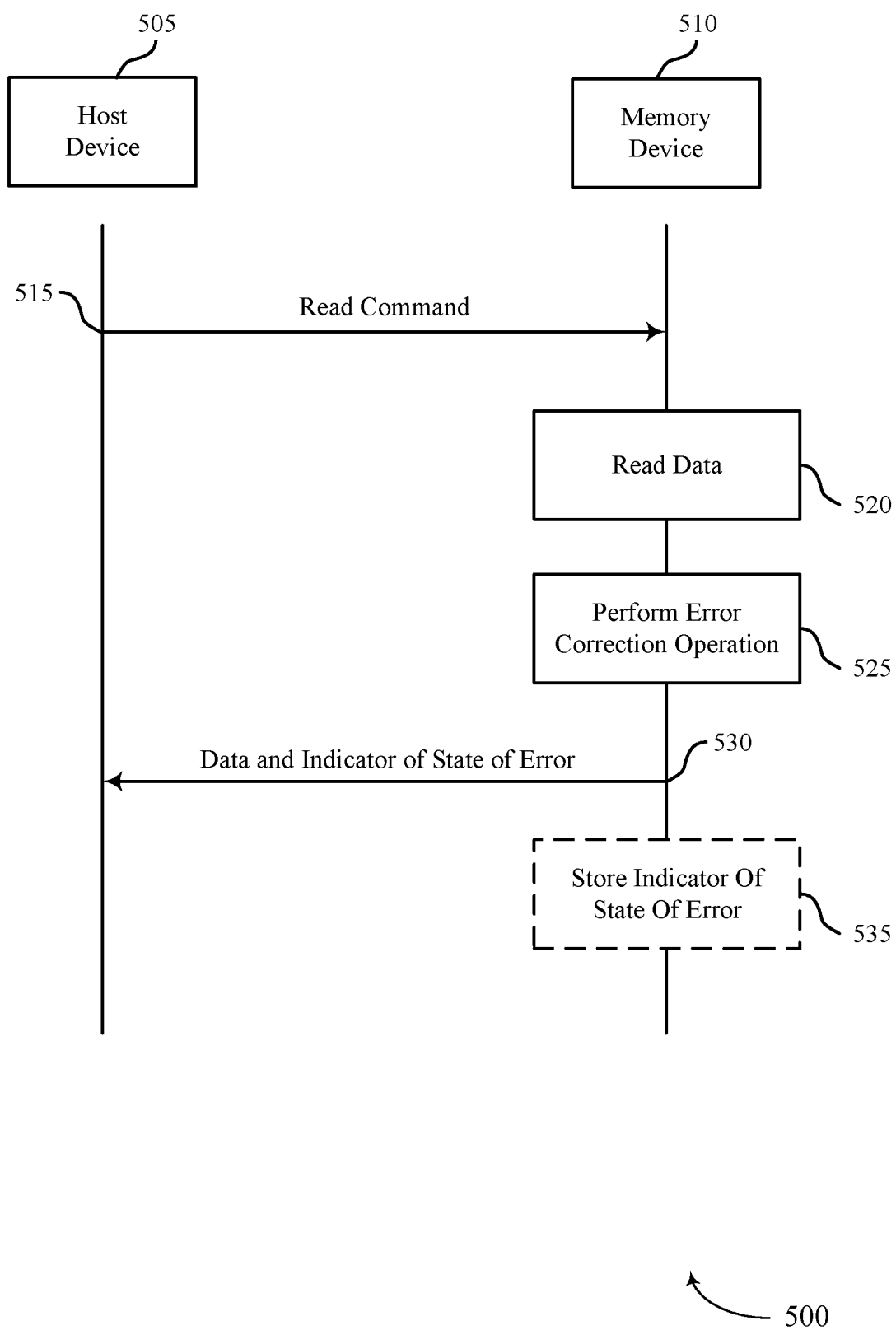
FIG. 5 illustrates an example of a process flow that supports a memory device with status feedback for error correction in accordance with examples as disclosed herein.

FIG. 5 illustrates an example of a process flow 500 that supports a memory device with status feedback for error correction in accordance with examples as disclosed herein. The process flow 500 may implement aspects of the systems 100 and 300 and memory die 200 described with reference to FIGS. 1 through 3. The process flow 500 may include operations performed by a host device 505, which may be an example of host device 305 as described with reference to FIG. 3. Host device 505 may implement aspects of the external memory controller 105 as described with reference to FIG. 1. The process flow 500 may further include operations performed by a memory device 510, which may be an example of the memory device 110, the memory array 170, or the memory die 200, or the memory device 310 as described with reference to FIGS. 1 through 3.

At 515, the memory device 510 may receive a read command from host device 505.

At 520, the memory device 510 may read first data of the memory array based on the read command.

At 525, the memory device 510 perform an error correction operation on the first data to obtain second data and an indicator of a state of error in the second data. In one example, the indicator of the state of error may indicate one of at least three states of error. In one case, the at least three states of error may include no detectable error, a corrected error, or an aliased error. In another case, the at least three states of error may include no detectable error, a corrected error, or an uncorrected error. In a third case, the at least three states of error include no detectable error, a corrected single-bit error, a detected double-bit error, a corrected triple-bit error, a detected triple-bit uncorrected error, a corrected odd error, a detected odd uncorrected error, a corrected even error, or a detected even uncorrected error.

In another example, the indicator of the state of error indicates a corrected error or no detectable error.

At 530, the memory device 510 may output data and the indicator of the state of error to the host device 505 during a burst interval. The data may be one of the first data or the second data. The memory device 510 may output the data using a first channel of the memory device 510 and output the indicator of the state of error using the second channel of the memory device 510. In some cases, the first and second channel may be different channels. For example, the first channel may be a data channel. The second channel may be associated with impedance calibration of the first channel. In some other cases, the first and second channel may be the same channel. For example, the memory device 510 may output the indicator of the state of error serially with outputting the first data or the second data (e.g., by a same channel).

The burst interval (e.g., during which the memory device 510 outputs the data and the indicator of the state of error)

may include a set of cycles. The memory device 510 may output the first data or the second data over the set of cycles using the first channel of the memory device 510. The memory device 510 may output the indicator of the state of error over a first portion of the set of cycles using the second channel of the memory device 510. The memory device 510 may output a link ECC over a second portion of the set of cycles using the second channel. The second portion of the set of cycles may occur before the first portion of the set of cycles (e.g., the memory device 510 may output the link ECC before outputting the indicator of the state of error).

At 535, the memory device 510 may optionally store the indicator of the state of error in a register at the memory device 510 based on performing the error correction operation. In some cases, outputting the indicator of the state of error is based on storing the indicator of the state of error in the register. The host device 505 may optionally poll the register to receive the indicator of the state of error.

Figure 6:
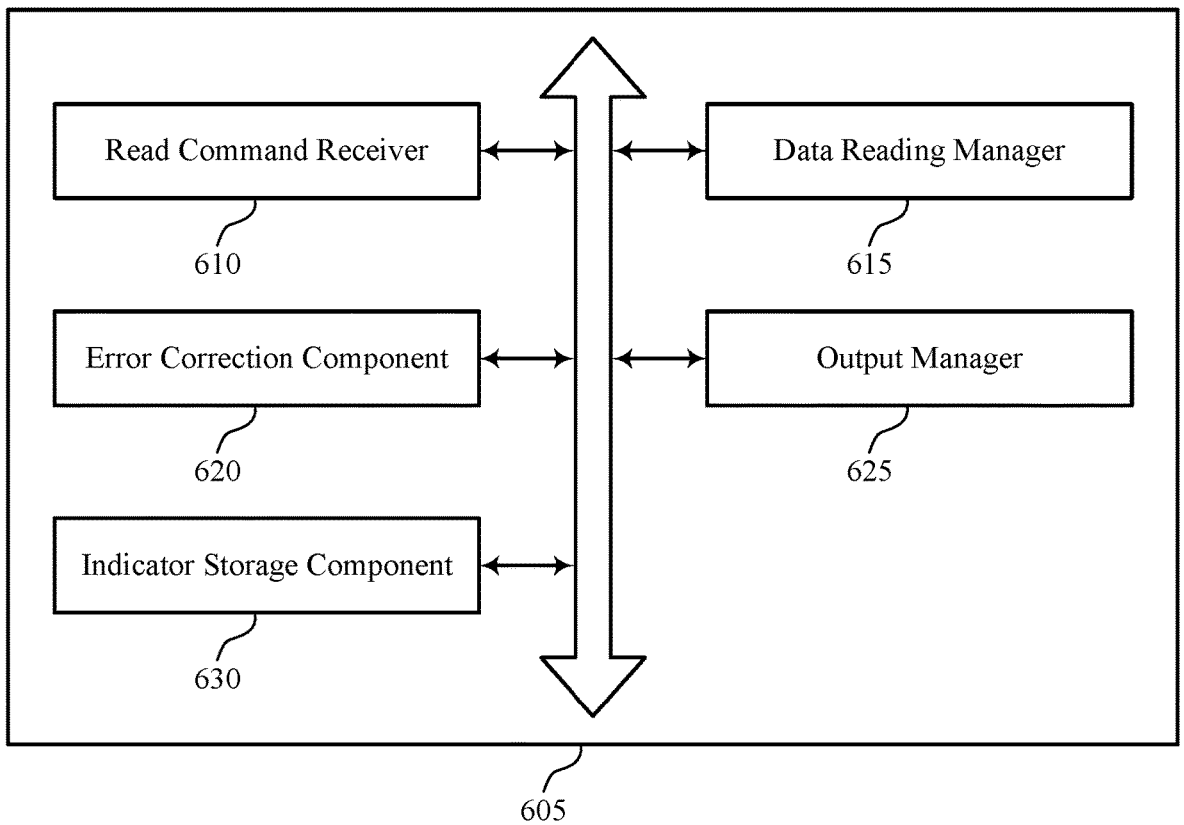
FIG. 6 shows a block diagram of a memory device that supports a memory device with status feedback for error correction in accordance with examples as disclosed herein.

FIG. 6 shows a block diagram 600 of a memory device 605 that supports a memory device with status feedback for error correction in accordance with examples as disclosed herein. The memory device 605 may be an example of aspects of a memory device as described with reference to FIGS. 1, 3, and 5. The memory device 605 may include a read command receiver 610, a data reading manager 615, an error correction component 620, an output manager 625, and an indicator storage component 630. Each of these modules may communicate, directly or indirectly, with one another (e.g., via one or more buses).

The read command receiver 610 may receive, at a memory device including a memory array, a read command from a host device.

The data reading manager 615 may read first data of the memory array based on the read command.

The error correction component 620 may perform an error correction operation on the first data to obtain second data and an indicator of a state of error in the second data. In a first example, the indicator may indicate one of at least three states of error. In some cases, the at least three states of error include no detectable error, a corrected error, or an aliased error. In some other cases, the at least three states of error include no detectable error, a corrected error, or an uncorrected error. In some other cases, the at least three states of error include no detectable error, a corrected single-bit error, a detected double-bit error, a corrected triple-bit error, a detected triple-bit uncorrected error, a corrected odd error, a detected odd uncorrected error, a corrected even error, or a detected even uncorrected error. In a second example, the indicator may indicate a corrected error or no detectable error.

The output manager 625 may output, to the host device during a burst interval, one of the first data or the second data using a first channel of the memory device and the indicator of the state of error using a second channel of the memory device. In some cases, the second channel may be different than the first channel. In some examples, the second channel is associated with impedance calibration of the first channel. In some cases, the output manager 625 may output a link error correction code using the second channel before outputting the indicator of the error. In some examples, the output manager 625 outputs the indicator of the state of error serially with outputting the first data or the second data.

The burst interval may include a plurality of cycles. Here, the output manager 625 may output the first data or the second data over the set of cycles using the first channel of the memory device. The output manager 625 may further output the indicator of the state of error over a first portion of the set of cycles using the second channel of the memory device different than the first channel. In some examples, the output manager 625 outputs a link error correction code over a second portion of the set of cycles using the second channel. In some cases, the second portion of the set of cycles occurs before the first portion of the set of cycles.

The indicator storage component 630 may store the indicator of the state of error in a register at the memory device based on performing the error correction operation. In some examples, the indicator storage component 630 stores the indicator of the state of error in a register during the burst interval, where outputting the indicator of the state of error is based on storing the indicator of the state of error in the register.

Figure 7:
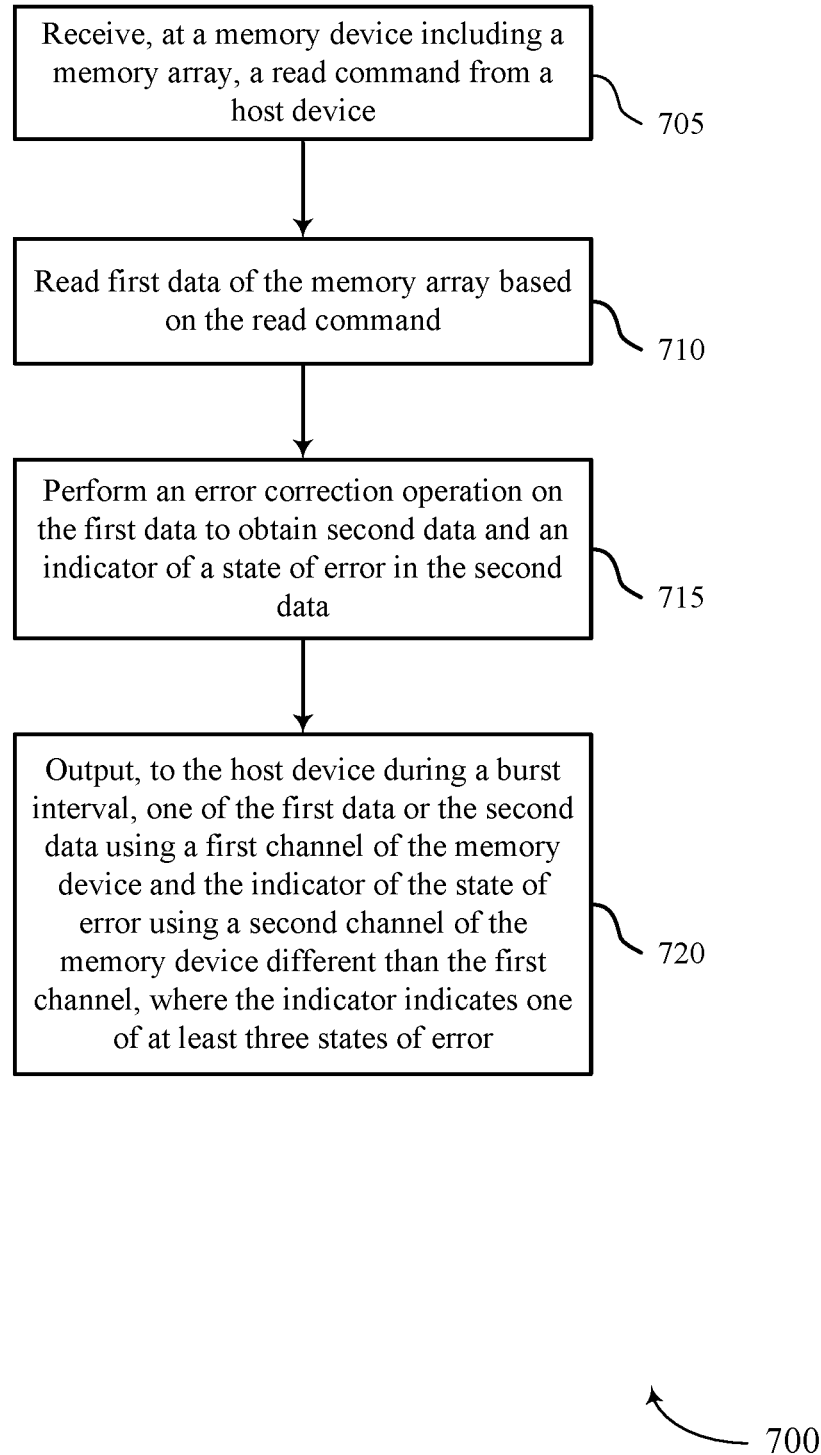
FIGS. 7 through 9 show flowcharts illustrating a method or methods that support memory devices with status feedback for error correction in accordance with examples as disclosed herein.

FIG. 7 shows a flowchart illustrating a method or methods 700 that supports a memory device with status feedback for error correction in accordance with examples of the present disclosure. The operations of method 700 may be implemented by a memory device or its components as described herein. For example, the operations of method 700 may be performed by a memory device as described with reference to FIG. 6. In some examples, a memory device executes a set of instructions to control the functional elements of the memory device to perform the described functions. Additionally or alternatively, a memory device may perform aspects of the described functions using special-purpose hardware.

At 705, the memory device including a memory array may receive a read command from a host device. The operations of 705 may be performed according to the methods described herein. In some examples, aspects of the operations of 705 may be performed by a read command receiver as described with reference to FIG. 6.

At 710, the memory device may read first data of the memory array based on the read command. The operations of 710 may be performed according to the methods described herein. In some examples, aspects of the operations of 710 may be performed by a data reading manager as described with reference to FIG. 6.

At 715, the memory device may perform an error correction operation on the first data to obtain second data and an indicator of a state of error in the second data. The operations of 715 may be performed according to the methods described herein. In some examples, aspects of the operations of 715 may be performed by an error correction component as described with reference to FIG. 6.

At 720, the memory device may output, to the host device during a burst interval, one of the first data or the second data using a first channel of the memory device and the indicator of the state of error using a second channel of the memory device different than the first channel, where the indicator indicates one of at least three states of error. The operations of 720 may be performed according to the methods described herein. In some examples, aspects of the operations of 720 may be performed by an output manager as described with reference to FIG. 6.

In some examples, an apparatus as described herein may perform a method or methods, such as the method 700. The apparatus may include features, means, or instructions (e.g., a non-transitory computer-readable medium storing instructions executable by a processor) for receiving, at a memory device including a memory array, a read command from a host device, reading first data of the memory array based on the read command, performing an error correction operation on the first data to obtain second data and an indicator of a state of error in the second data, and outputting, to the host device during a burst interval, one of the first data or the second data using a first channel of the memory device and the indicator of the state of error using a second channel of the memory device different than the first channel, where the indicator indicates one of at least three states of error.

In some examples of the method 700 and the apparatus described herein, the burst interval may include operations, features, means, or instructions for outputting the first data or the second data over the set of cycles using the first channel of the memory device, and outputting the indicator of the state of error over a first portion of the set of cycles using the second channel of the memory device different than the first channel.

Some examples of the method 700 and the apparatus described herein may further include operations, features, means, or instructions for outputting a link error correction code over a second portion of the set of cycles using the second channel.

In some cases of the method 700 and the apparatus described herein, the second portion of the set of cycles occurs before the first portion of the set of cycles.

In some instances of the method 700 and the apparatus described herein, the second channel may be associated with impedance calibration of the first channel.

Some examples of the method 700 and the apparatus described herein may further include operations, features, means, or instructions for outputting the indicator of the state of error serially with outputting the first data or the second data.

Some cases of the method 700 and the apparatus described herein may further include operations, features, means, or instructions for storing the indicator of the state of error in a register at the memory device based on performing the error correction operation.

In some instances of the method 700 and the apparatus described herein, the at least three states of error include no detectable error, a corrected error, or an aliased error.

In some examples of the method 700 and the apparatus described herein, the at least three states of error include no detectable error, a corrected error, or an uncorrected error.

In some cases of the method 700 and the apparatus described herein, the at least three states of error include no detectable error, a corrected single-bit error, a detected double-bit error, a corrected triple-bit error, a detected triple-bit uncorrected error, a corrected odd error, a detected odd uncorrected error, a corrected even error, or a detected even uncorrected error.

Figure 8:
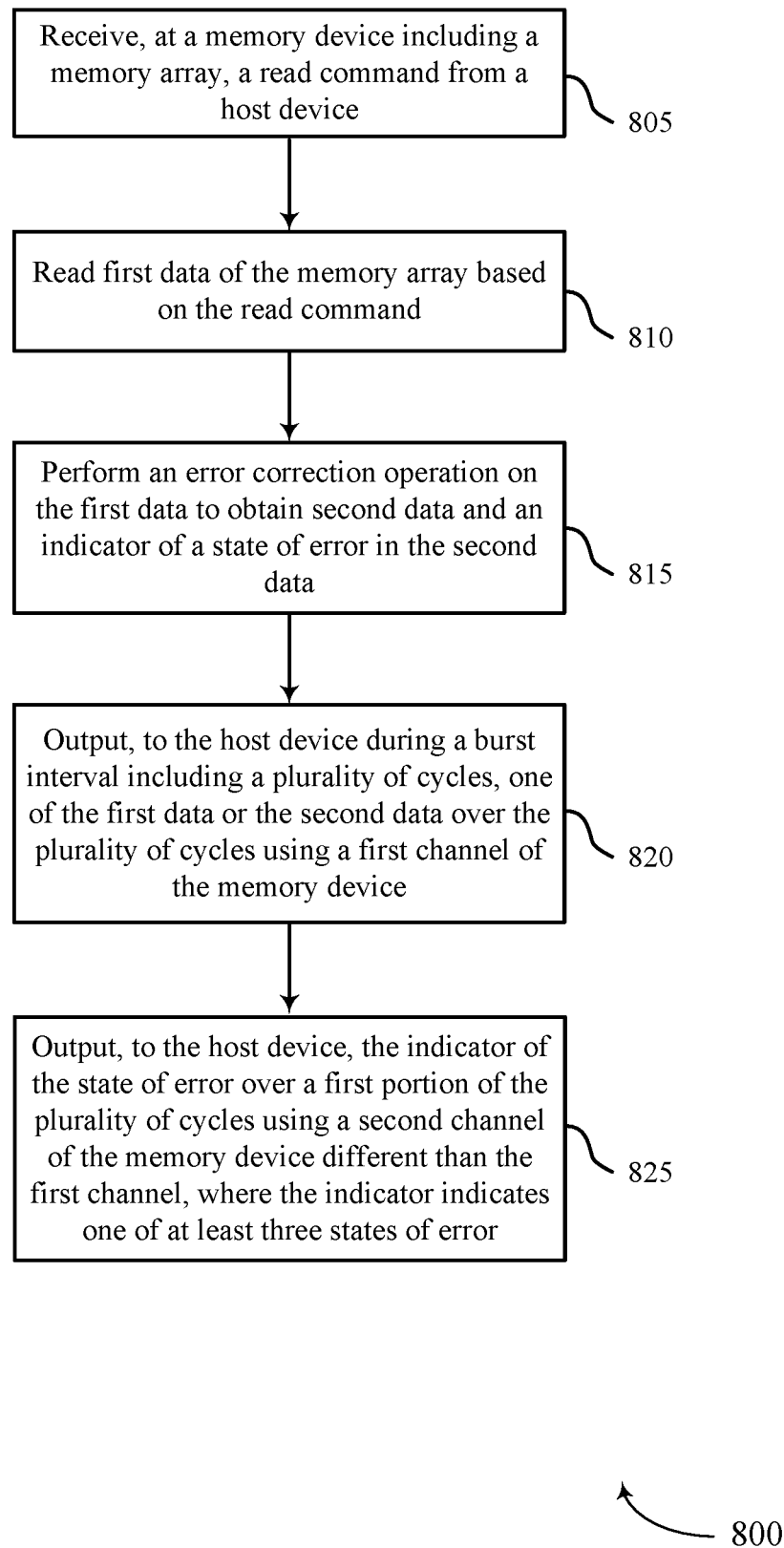

FIG. 8 shows a flowchart illustrating a method or methods 800 that supports a memory device with status feedback for error correction in accordance with examples of the present disclosure. The operations of method 800 may be implemented by a memory device or its components as described herein. For example, the operations of method 800 may be performed by a memory device as described with reference to FIG. 6. In some examples, a memory device may execute a set of instructions to control the functional elements of the memory device to perform the described functions. Additionally or alternatively, a memory device may perform aspects of the described functions using special-purpose hardware.

At 805, the memory device may receive, at a memory device including a memory array, a read command from a host device. The operations of 805 may be performed according to the methods described herein. In some examples, aspects of the operations of 805 may be performed by a read command receiver as described with reference to FIG. 6.

At 810, the memory device may read first data of the memory array based on the read command. The operations of 810 may be performed according to the methods described herein. In some examples, aspects of the operations of 810 may be performed by a data reading manager as described with reference to FIG. 6.

At 815, the memory device may perform an error correction operation on the first data to obtain second data and an indicator of a state of error in the second data. The operations of 815 may be performed according to the methods described herein. In some examples, aspects of the operations of 815 may be performed by an error correction component as described with reference to FIG. 6.

At 820 and 825, the memory device may output, to the host device during a burst interval, one of the first data or the second data using a first channel of the memory device and the indicator of the state of error using a second channel of the memory device different than the first channel, where the indicator indicates one of at least three states of error.

At 820, the memory device may output the first data or the second data over the set of cycles using the first channel of the memory device. The operations of 820 may be performed according to the methods described herein. In some examples, aspects of the operations of 820 may be performed by an output manager as described with reference to FIG. 6.

At 825, the memory device may output the indicator of the state of error over a first portion of the set of cycles using the second channel of the memory device different than the first channel. The operations of 825 may be performed according to the methods described herein. In some examples, aspects of the operations of 825 may be performed by an output manager as described with reference to FIG. 6.

Figure 9:
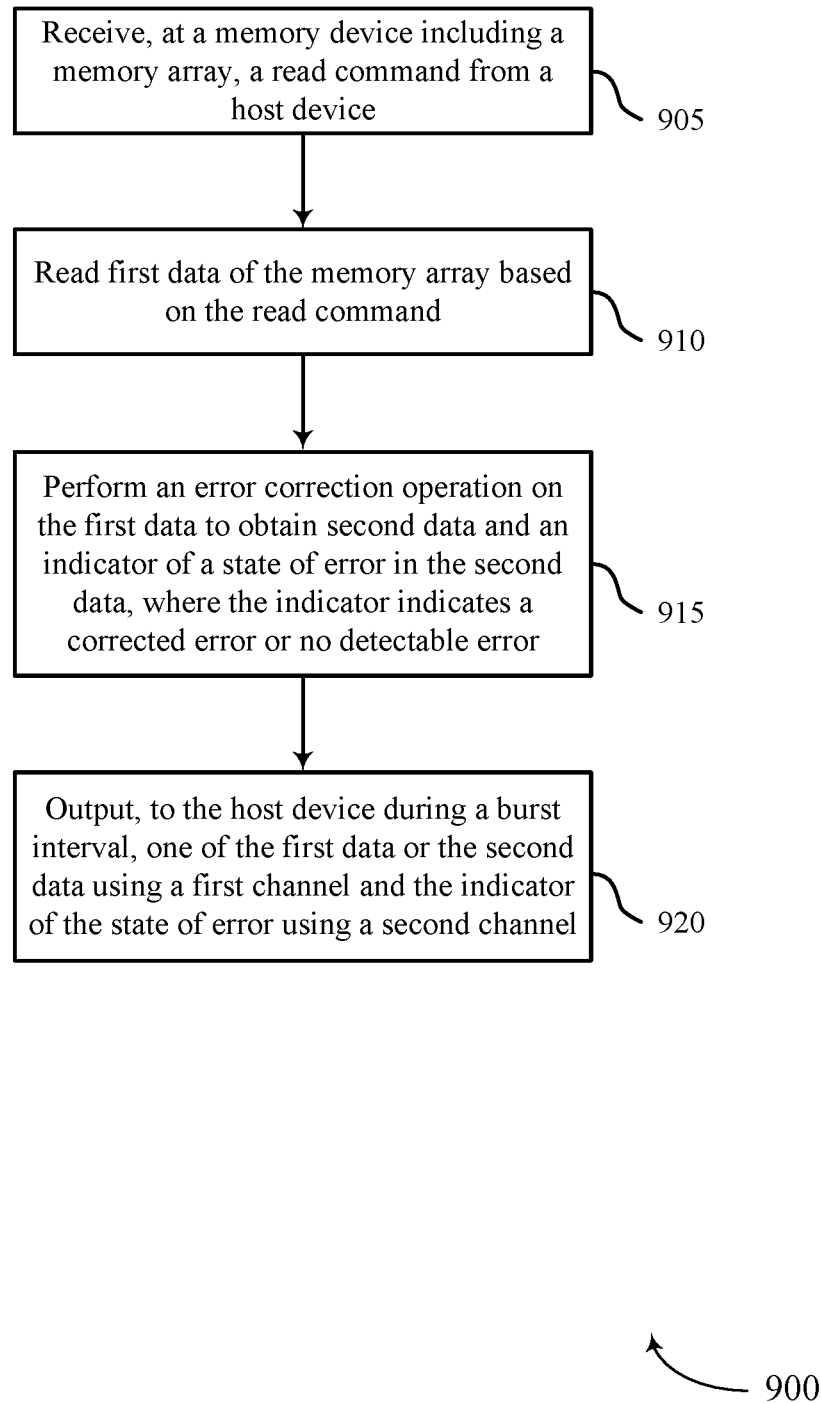

FIG. 9 shows a flowchart illustrating a method or methods 900 that supports a memory device with status feedback for error correction in accordance with examples of the present disclosure. The operations of method 900 may be implemented by a memory device or its components as described herein. For example, the operations of method 900 may be performed by a memory device as described with reference to FIG. 6. In some examples, a memory device may execute a set of instructions to control the functional elements of the memory device to perform the described functions. Additionally or alternatively, a memory device may perform aspects of the described functions using special-purpose hardware.

At 905, the memory device may receive, at a memory device including a memory array, a read command from a host device. The operations of 905 may be performed according to the methods described herein. In some examples, aspects of the operations of 905 may be performed by a read command receiver as described with reference to FIG. 6.

At 910, the memory device may read first data of the memory array based on the read command. The operations of 910 may be performed according to the methods described herein. In some examples, aspects of the operations of 910 may be performed by a data reading manager as described with reference to FIG. 6.

At 915, the memory device may perform an error correction operation on the first data to obtain second data and an indicator of a state of error in the second data, where the indicator indicates a corrected error or no detectable error. The operations of 915 may be performed according to the methods described herein. In some examples, aspects of the operations of 915 may be performed by an error correction component as described with reference to FIG. 6.

At 920, the memory device may output, to the host device during a burst interval, one of the first data or the second data using a first channel and the indicator of the state of error using a second channel. The operations of 920 may be performed according to the methods described herein. In some examples, aspects of the operations of 920 may be performed by an output manager as described with reference to FIG. 6.

In some examples, an apparatus as described herein may perform a method or methods, such as the method 900. The apparatus may include features, means, or instructions (e.g., a non-transitory computer-readable medium storing instructions executable by a processor) for receiving, at a memory device including a memory array, a read command from a host device, reading first data of the memory array based on the read command, performing an error correction operation on the first data to obtain second data and an indicator of a state of error in the second data, where the indicator indicates a corrected error or no detectable error, and outputting, to the host device during a burst interval, one of the first data or the second data using a first channel and the indicator of the state of error using a second channel.

Some examples of the method 900 and the apparatus described herein may further include operations, features, means, or instructions for outputting a link error correction code using the second channel before outputting the indicator of the error.

In some cases of the method 900 and the apparatus described herein, the second channel may be associated with impedance calibration of the first channel.

Some instances of the method 900 and the apparatus described herein may further include operations, features, means, or instructions for outputting, using a channel, the indicator of the state of error serially with outputting the first data or the second data.

Some examples of the method 900 and the apparatus described herein may further include operations, features, means, or instructions for storing the indicator of the state of error in a register during the burst interval, where outputting the indicator of the state of error may be based on storing the indicator of the state of error in the register.

It should be noted that the methods described above describe possible implementations, and that the operations and the steps may be rearranged or otherwise modified and that other implementations are possible. Furthermore, aspects from two or more of the methods may be combined.

In some examples, an apparatus corresponding to a memory device with status feedback for error correction may perform aspects of the function described herein using general- or special-purpose hardware. The apparatus may include an array of memory cells that each include capacitive storage elements, an interface configured to receive a read command from a host device, a first circuit coupled with the interface and the array of memory cells and configured to read first data from the array of memory cells based on the read command, and a second circuit coupled to the first circuit and configured to perform an error correction operation on the first data to obtain second data and an indicator of a state of error in the second data, where the indicator of the state of error indicates one of at least three states of error. The interface may be configured to communicate, with the host device, the indicator of the state of error and one of the first data or the second data during a burst interval.

In some examples, the burst interval includes a set of cycles and the interface is configured to output the first data or the second data over the set of cycles via a first channel, and output the indicator of the state of error over a first portion of the set of cycles via a second channel different than the first channel.

In some cases, the second channel is further configured to communicate a link error correction code over a second portion of the set of cycles.

In some instances, the second portion of the set of cycles occurs before the first portion of the set of cycles.

In some examples, the interface is further configured to communicate the indicator of the state of error via a first channel serially with communicating the first data or the second data via the first channel.

In some cases, the at least three states of error include no detectable error, a corrected error, or an aliased error. In some other cases, the at least three states of error include no detectable error, a corrected error, or an uncorrected error. In some other cases, the at least three states of error comprise no detectable error, a corrected single-bit error, a detected double-bit error, a corrected triple-bit error, a detected triple-bit uncorrected error, a corrected odd error, a detected odd uncorrected error, a corrected even error, or a detected even uncorrected error.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

As used herein, the term "virtual ground" refers to a node of an electrical circuit that is held at a voltage of approximately zero volts (0V) but that is not directly coupled with ground. Accordingly, the voltage of a virtual ground may temporarily fluctuate and return to approximately 0V at steady state. A virtual ground may be implemented using various electronic circuit elements, such as a voltage divider consisting of operational amplifiers and resistors. Other implementations are also possible. "Virtual grounding" or "virtually grounded" means connected to approximately 0V.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving, at a memory device comprising a memory array, a read command from a host device;
   reading first data of the memory array based at least in part on the read command;
   performing an error correction operation on the first data to obtain second data and an indicator of a state of error in the second data; and
   outputting, to the host device during a burst interval, one of the first data or the second data using a first channel of the memory device and the indicator of the state of error using a second channel of the memory device different than the first channel, wherein the indicator indicates one of at least three states of error.

2. The method of claim 1, wherein the burst interval comprises a plurality of cycles, the method further comprising:
   outputting the first data or the second data over the plurality of cycles using the first channel of the memory device; and
   outputting the indicator of the state of error over a first portion of the plurality of cycles using the second channel of the memory device different than the first channel.

3. The method of claim 2, further comprising:
   outputting a link error correction code over a second portion of the plurality of cycles using the second channel.

4. The method of claim 3, wherein the second portion of the plurality of cycles occurs before the first portion of the plurality of cycles.

5. The method of claim 2, wherein the second channel is associated with impedance calibration of the first channel.

6. The method of claim 1, further comprising:
   outputting the indicator of the state of error serially with outputting the first data or the second data.

7. The method of claim 1, further comprising:
   storing the indicator of the state of error in a register at the memory device based at least in part on performing the error correction operation.

8. The method of claim 1, wherein the at least three states of error comprise no detectable error, a corrected error, or an aliased error.

9. The method of claim 1, wherein the at least three states of error comprise no detectable error, a corrected error, or an uncorrected error.

10. The method of claim 1, wherein the at least three states of error comprise no detectable error, a corrected single-bit error, a detected double-bit error, a corrected triple-bit error, a detected triple-bit uncorrected error, a corrected odd error, a detected odd uncorrected error, a corrected even error, or a detected even uncorrected error.

11. A method, comprising:
    receiving, at a memory device comprising a memory array, a read command from a host device;
    reading first data of the memory array based at least in part on the read command;
    performing an error correction operation on the first data to obtain second data and an indicator of a state of error in the second data, wherein the indicator indicates a corrected error or no detectable error;
    outputting, to the host device during a burst interval, one of the first data or the second data using a first channel; and
    outputting, using a second channel, the indicator of the state of error serially with outputting the first data or the second data.

12. The method of claim 11, further comprising:
    outputting a link error correction code using the second channel before outputting the indicator of the error.

13. The method of claim 11, wherein the second channel is associated with impedance calibration of the first channel.

14. The method of claim 11, further comprising:
    storing the indicator of the state of error in a register during the burst interval, wherein outputting the indicator of the state of error is based at least in part on storing the indicator of the state of error in the register.

15. A device, comprising:
    an array of memory cells that each comprise capacitive storage elements;
    an interface configured to receive a read command from a host device;
    a first circuit coupled with the interface and the array of memory cells and configured to read first data from the array of memory cells based at least in part on the read command; and
    a second circuit coupled to the first circuit and configured to perform an error correction operation on the first data to obtain second data and an indicator of a state of error in the second data, wherein the indicator of the state of error indicates one of at least three states of error, and wherein the interface is configured to communicate, with the host device, the indicator of the state of error and one of the first data or the second data during a burst interval.

16. The device of claim 15, wherein the burst interval comprises a plurality of cycles and the interface is configured to:

output the first data or the second data over the plurality of cycles via a first channel; and output the indicator of the state of error over a first portion of the plurality of cycles via a second channel different than the first channel.

17. The device of claim 16, wherein the second channel is further configured to communicate a link error correction code over a second portion of the plurality of cycles.

18. The device of claim 17, wherein the second portion of the plurality of cycles occurs before the first portion of the plurality of cycles.

19. The device of claim 15, wherein the interface is further configured to communicate the indicator of the state of error via a first channel serially with communicating the first data or the second data via the first channel.

20. The device of claim 15, wherein the at least three states of error comprise no detectable error, a corrected error, or an aliased error.

21. The device of claim 15, wherein the at least three states of error comprise no detectable error, a corrected error, or an uncorrected error.

22. The device of claim 15, wherein the at least three states of error comprise no detectable error, a corrected single-bit error, a detected double-bit error, a corrected triple-bit error, a detected triple-bit uncorrected error, a corrected odd error, a detected odd uncorrected error, a corrected even error, or a detected even uncorrected error.

* * * * *